United States Patent
Niu et al.

(10) Patent No.: US 12,481,252 B2
(45) Date of Patent: Nov. 25, 2025

(54) PROCESS CONTROLLER AND METHOD AND SYSTEM THEREFOR

(71) Applicant: Siemens Aktiengesellschaft, Munich (DE)

(72) Inventors: Zhu Niu, Chao yang (CN); Bo Wen, Beijing (CN); Shun Jie Fan, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 1238 days.

(21) Appl. No.: 17/267,928

(22) PCT Filed: Aug. 14, 2018

(86) PCT No.: PCT/CN2018/100449
§ 371 (c)(1),
(2) Date: Feb. 11, 2021

(87) PCT Pub. No.: WO2020/034092
PCT Pub. Date: Feb. 20, 2020

(65) Prior Publication Data
US 2021/0318661 A1   Oct. 14, 2021

(51) Int. Cl.
*G05B 13/02* (2006.01)
*G06N 3/08* (2023.01)

(52) U.S. Cl.
CPC ......... *G05B 13/021* (2013.01); *G05B 13/024* (2013.01); *G05B 13/027* (2013.01); *G06N 3/08* (2013.01)

(58) Field of Classification Search
USPC .......................................................... 700/48
See application file for complete search history.

(56) References Cited

U.S. PATENT DOCUMENTS

2004/0249483 A1   12/2004   Wojsznis
2010/0049339 A1   2/2010    Schaefer et al.
(Continued)

FOREIGN PATENT DOCUMENTS

CN   1316070 A   10/2001
CN   1598720 A   3/2005
(Continued)

OTHER PUBLICATIONS

Bai Yun et al: "Deep neural network for manufacturing quality prediction"; 2017 Prognostics and System Health Managment Conference (PHM-HARBIN), IEEE; Jul. 9, 2017, pp. 1-5, XP033233507.
(Continued)

Primary Examiner — Sean Shechtman
(74) Attorney, Agent, or Firm — Harness, Dickey & Pierce, P.L.C.

(57) ABSTRACT

A processor controller includes: a deep neutral network, for extracting, based upon feature information of process control data, from a process control data storage device, process control data available to a production device to be controlled, the feature information of the process control data including at least production device feature parameters and a production device load; and an enhanced neural network, for performing, based upon a process control prediction model, process control prediction by using real-time process control data of said production device. In an embodiment, the process control prediction model is trained by using the extracted available process control data. The process controller further includes a process control decision unit, for determining an operation control instruction for the production device based upon the result of process control prediction. As such, prediction accuracy and training efficiency of the process control prediction model of the process controller can be improved.

16 Claims, 11 Drawing Sheets

(56) References Cited

U.S. PATENT DOCUMENTS

| | | | |
|---|---|---|---|
| 2010/0094788 A1 | 4/2010 | Schaefer et al. | |
| 2016/0223600 A1 | 8/2016 | Wang et al. | |
| 2017/0228644 A1* | 8/2017 | Kurokawa | G06N 3/04 |

FOREIGN PATENT DOCUMENTS

| | | |
|---|---|---|
| CN | 1673909 A | 9/2005 |
| CN | 101751026 A | 6/2010 |
| CN | 104915747 A | 9/2015 |
| CN | 108051999 A | 5/2018 |
| CN | 108197773 A | 6/2018 |
| JP | H05324007 A | 12/1993 |

OTHER PUBLICATIONS

Neshat N. et al: "An enhanced neural network model for predictive control of granule quality characteristics"; Scientia Iranica; vol. 18, No. 3, Jun. 1, 2011 (Jun. 1, 2011), pp. 722-730, XP055876474.
Anonymous: "Deep learning—Wikipedia"; May 22, 2018, XP055606047.
PCT International Search Report and Written Opinion of International Searching Authority mailed Dec. 12, 2018 corresponding to PCT International Application No. PCT/CN2018/100449 filed on Aug. 14, 2018.

\* cited by examiner

PROCESS CONTROLLER AND METHOD AND SYSTEM THEREFOR

PRIORITY STATEMENT

This application is the national phase under 35 U.S.C. § 371 of PCT International Application No. PCT/CN2018/100449 which has an International filing date of Aug. 14, 2018, which designated the United States of America, the entire contents of which are hereby incorporated herein by reference.

FIELD

Embodiments of the present invention generally relate to the field of process control, and in particular to a method for process control of a production device of at least one production site, a process controller and the system thereof.

BACKGROUND

The predictive controller is widely applied in process control and is successfully applied in various industrial applications. In process predictive control, the predictive controller utilizes a process model to take control actions based on the predicted values for a process.

However, it is difficult to obtain a process model (for example, nonlinear model) in some practical process automation systems. In addition, the process model tends to drift over time because of changes of the raw material and wear-out of the machine, thus resulting in the mismatch problem. In view of excellent performance (for example, being model free, adaptive and having low online complexity) of a reinforcement learning (RL) controller in process control and many years of applications of the RL controller in intelligent control, the RL controller is preferred to solve the problem.

The control policies of the RL controller are based on an artificial neural network (ANN). In the presence of a sufficient number of data flows, the proxies in the ANN will face the following problem: They must export the high-efficiency expressions of the environment from high-dimension input and these expressions are used to generalize the past experience into new solutions.

In the prior RL controller solutions, the ANN of the RL controller is trained by only using the data from the data storage device of its own site (namely, its own automatic system). It is usually very difficult to realize online data interactions between different automatic systems, for example, by manually copying history data, let alone real-time online data interactions between different automatic systems.

With the development of various cloud platforms, more and more solutions can be realized on cloud platforms. Since cloud platforms have the characteristics of convenient information interactions, a low hardware cost and easy maintenance, the MindSphere cloud platform of Siemens, for example, becomes an important component in Industry 4.0.

In recent years, prediction solutions based on an ANN and a cloud platform have been proposed. FIG. 1 shows the architecture of a prediction solution based on an ANN and a cloud platform. As shown in FIG. 1, the area data acquisition devices 10, for example, 10-1, 10-2 and 10-3, first collect the field data of different areas and upload the field data to a data exchange platform 20. Then, the data exchange platform 20 reorganizes the collected field data and supplies the reorganized field data to the ANN 30 of the controller for ANN training. The trained ANN 40 is responsible for predicting the performance and alarms, and the prediction results of the performance and alarms will be shared in the cloud platform 80.

However, since the reinforced training for the ANN is only based on history process control data of its own site in the above-mentioned prediction solution, it is difficult for the ANN of the process controller to give a control policy for a situation which has never happened before.

In addition, the controller having the ANN 30 is a hardware device implemented on the site side in the above-mentioned prediction solution, and the controller is of a high cost and inconvenient to maintain. In addition, in the above-mentioned prediction solution, data is only transmitted from edge devices to a cloud platform, but does not return from the cloud platform to the edge devices. Thus, it is not possible to implement interactive knowledge learning between ANNs of the controller of the production devices of different production sites in the prediction solution.

SUMMARY

An embodiment of the present application provides a method for process control of a production device of at least one production site, a process controller and the system thereof. By utilizing the method, the process controller and the system to send the process control data collected by the automatic control systems of different production sites for different production devices to a process control data storage device, extract process control data available to each production device to be controlled for the production device to be controlled from a process control data storage device on the basis of characteristic information of process control data, use the available process control data to train the process control prediction model of the production device to be controlled, use the trained process control prediction model to predict the result of the process control prediction of the production device to be controlled, and determine an operation control instruction for the production device to be controlled on the basis of the result of the process control prediction, the process controller can give a proper control policy for a situation which has never happened to the process controller before (for example, the situation has happened to the production devices of other production sites).

According to one embodiment of the present application, a process controller is provided, and the process controller comprises: a deep neural network, configured to extract process control data available to a production device to be controlled from a process control database on the basis of characteristic information of process control data, wherein history process control data of at least one production device is stored in the process control database and the characteristic information of the process control data comprises at least production device characteristic parameters and production device loads; an enhanced neural network, configured to utilize real-time process control data from the production device to be controlled to predict the process control on the basis of a process control prediction model, wherein the process control prediction model is trained by using the extracted available process control data; and a process control decision-making unit, configured to determine an operation control instruction for the production device to be controlled on the basis of the result of the process control prediction.

According to another embodiment of the present application, a process control system is provided, and the process control system comprises: at least one production site, wherein each production site comprises production devices and an automatic control system and the automatic control system is configured to control the operation of a corresponding production device; at least one process controller; and a process control data storage device, configured to store history process control data of at least one production device.

According to a further embodiment of the present application, a method for process control of a production device of at least one production site is provided, and the method comprises: extracting process control data available to a production device to be controlled from a process control data storage device on the basis of characteristic information of process control data, wherein history process control data of at least one production device is stored in the process control data storage device and the characteristic information of the process control data comprises at least production device characteristic parameters and production device loads, utilizing real-time process control data from the production device to be controlled to predict the process control on the basis of a process control prediction model, wherein the process control prediction model is trained by using the extracted available process control data, and determining an operation control instruction for the production device to be controlled on the basis of the result of the process control prediction.

According to a fourth embodiment of the present application, a computing device is provided, and the computing device comprises at least one processor and a memory coupled with the at least one processor and configured to store instructions, wherein when the instructions are executed by the at least one processor, the processor will execute an embodiment of the method for process control of the production device of at least one production site.

According to a fifth embodiment of the present application, a non-transient machine-readable storage medium is provided, the non-transient machine-readable storage medium stores executable instructions, and when the instructions are executed, the machine will execute an embodiment of the method for process control of the production device of at least one production site.

BRIEF DESCRIPTION OF THE DRAWINGS

The essence and advantages of the disclosure may further be understood by reference to the drawings. In the drawings, similar components or characteristics may have the same reference numerals.

DESCRIPTION OF REFERENCE NUMERALS IN THE DRAWINGS

Figure 1:
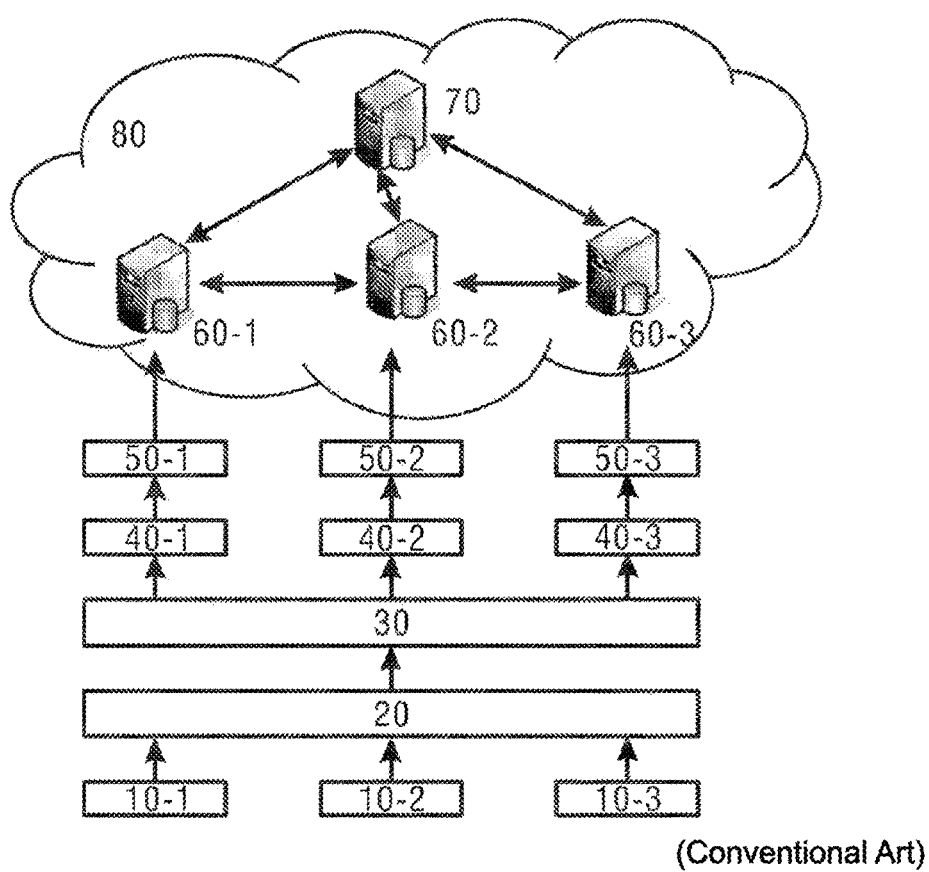
FIG. 1 is a block diagram of the architecture of the prediction solution based on an ANN and a cloud platform.

10-1, 10-2, 10-3: Area data acquisition device
20: Data exchange platform
30: ANN
40-1, 40-2, 40-3: Area prediction result
50-1, 50-2, 50-3: Decision-making module
60-1, 60-2, 60-3: Area manager
70: Cloud platform manager
80: Cloud platform
1, 1': Process control system
100: Production site
110-1, 110-2, 110-3: Production device
120-1, 120-2, 120-3: Automatic system
130-1, 130-2, 130-3: Gateway
200-1, 201-2, 201-3: Process controller
200': Process controller
300: Process control data storage device
210, 210': Deep neural network
220: Enhanced neural network
230: Process control decision-making unit
240: Process control decision sending unit
211: Characteristic similarity determination module
213: Load similarity determination module
215: Controlled range similarity determination module
217: Normal working condition data determination module
218: Removal module
219: Acquisition module
810: Extract process control data available to a production device to be controlled from a process control database on the basis of the characteristic information of process control data
830: Use the extracted available process control data to train a process control prediction model
850: Utilize real-time process control data from the production device to be controlled to predict the process control on the basis of the trained process control prediction model
870: Determine an operation control instruction for the production device to be controlled on the basis of the result of the process control prediction
890: Send the determined operation control instruction for the production device to be controlled to an automatic control system of the production device
805: Acquire characteristic information of the process control data of the production device to be controlled
811: Determine a production device having production device characteristic parameters similar to those of the production device to be controlled on the basis of the production device characteristic parameters 813: Extract process control data having a production device load similar to the production device load of the production device to be controlled from the process control data produced by the production device determined to have similar characteristic parameters 815: Extract process control data in which a controlled range of a controlled variable matches the controlled range of the controlled variable of the production device to be controlled on the basis of a controlled range of a controlled variable 817: Determine whether the process control data is normal working condition data on the basis of the standard deviation and variable coupling degree of the process control data 819: Remove process control data which is determined to be abnormal working condition data from the process control data 1100: Computing device 1110: At least one processor 1120: Memory

DETAILED DESCRIPTION OF THE EXAMPLE EMBODIMENTS

According to one embodiment of the present application, a process controller is provided, and the process controller comprises: a deep neural network, configured to extract process control data available to a production device to be controlled from a process control database on the basis of characteristic information of process control data, wherein history process control data of at least one production device is stored in the process control database and the characteristic information of the process control data comprises at least production device characteristic parameters and production device loads; an enhanced neural network, configured to utilize real-time process control data from the production device to be controlled to predict the process control on the basis of a process control prediction model, wherein the process control prediction model is trained by using the extracted available process control data; and a process control decision-making unit, configured to determine an operation control instruction for the production device to be controlled on the basis of the result of the process control prediction.

Alternatively, in one example of the above-mentioned embodiment, the deep neural network comprises: a characteristic similarity determination module, configured to determine a production device having production device characteristic parameters similar to those of the production device to be controlled on the basis of the production device characteristic parameters; and a load similarity determination module, configured to extract process control data having a production device load similar to the production device load of the production device to be controlled as process control data available to the production device to be controlled from the process control data produced by the production device determined to have similar characteristic parameters.

Alternatively, in one example of the above-mentioned embodiment, the deep neural network further comprises: an acquisition module, configured to acquire characteristic information of the process control data of the production device to be controlled.

Alternatively, in one example of the above-mentioned embodiment, the process controller may further comprise: a process control decision sending unit, configured to send the determined operation control instruction for the production device to be controlled to an automatic control system of the production device to be controlled so that the automatic control system controls the operation of the production device according to the operation control instruction.

Alternatively, in one example of the above-mentioned embodiment, the process control data may comprise operational variable data, controlled variable data and/or disturbance variable data.

Alternatively, in one example of the above-mentioned embodiment, the characteristic information of the process control data may comprise a controlled range of a controlled variable, and the deep neural network may further comprise: a controlled range similarity determination module, configured to extract process control data in which a controlled range of a controlled variable matches the controlled range of the controlled variable of the production device to be controlled from the extracted process control data having a production device load similar to the production device load of the production device to be controlled on the basis of a controlled range of a controlled variable.

Alternatively, in one example of the above-mentioned embodiment, the characteristic information of the process control data may comprise: a standard deviation and a variable coupling degree of process control data, and the deep neural network may comprise: a normal working condition data determination module, configured to determine whether the process control data is normal working condition data on the basis of the standard deviation and variable coupling degree of the process control data; and a removal module, configured to remove process control data which is abnormal working condition data from the process control data.

According to another embodiment of the present application, a process control system is provided, and the process control system comprises: at least one production site, wherein each production site comprises production devices and an automatic control system and the automatic control system is configured to control the operation of a corresponding production device; at least one process controller; and a process control data storage device, configured to store history process control data of at least one production device.

Alternatively, in one example of the above-mentioned embodiment, each production site comprises a network protocol interface, configured to realize communication between the production site and the process controller and communication between the production site and the process control data storage device.

Alternatively, in one example of the above-mentioned embodiment, the process controller and the process control data storage device are deployed in a cloud server.

Alternatively, in one example of the above-mentioned embodiment, the process controller is implemented as an application module.

According to a further embodiment of the present application, a method for process control of a production device of at least one production site is provided, and the method comprises: extracting process control data available to a production device to be controlled from a process control data storage device on the basis of characteristic information of process control data, wherein history process control data of at least one production device is stored in the process control data storage device and the characteristic information of the process control data comprises at least production device characteristic parameters and production device loads, utilizing real-time process control data from the production device to be controlled to predict the process control on the basis of a process control prediction model, wherein the process control prediction model is trained by using the extracted available process control data, and determining an operation control instruction for the production device to be controlled on the basis of the result of the process control prediction.

Alternatively, in one example of the above-mentioned embodiment, extracting process control data available to a production device to be controlled from a process control data storage device on the basis of the characteristic information of process control data comprises: determining a production device having production device characteristic parameters similar to those of the production device to be controlled on the basis of the production device characteristic parameters, and extracting process control data having a production device load similar to the production device load of the production device to be controlled as process control data available to the production device to be controlled from the process control data produced by the production device determined to have similar characteristic parameters.

Alternatively, in one example of the above-mentioned embodiment, the method may further comprise: acquiring characteristic information of the process control data of the production device to be controlled.

Alternatively, in one example of the above-mentioned embodiment, the method may further comprise: sending the determined operation control instruction for the production device to be controlled to an automatic control system of the production device to be controlled so that the automatic control system controls the operation of the production device according to the operation control instruction.

Alternatively, in one example of the above-mentioned embodiment, the process control data may comprise operational variable data, controlled variable data and/or disturbance variable data.

Alternatively, in one example of the above-mentioned embodiment, the characteristic information of the process control data may comprise at least one of the following: a controlled range of a controlled variable, a standard deviation and a variable coupling degree.

According to a fourth embodiment of the present application, a computing device is provided, and the computing device comprises at least one processor and a memory coupled with the at least one processor and configured to store instructions, wherein when the instructions are executed by the at least one processor, the processor will execute an embodiment of the method for process control of the production device of at least one production site.

According to a fifth embodiment of the present application, a non-transient machine-readable storage medium is provided, the non-transient machine-readable storage medium stores executable instructions, and when the instructions are executed, the machine will execute an embodiment of the method for process control of the production device of at least one production site.

By utilizing the method, the process controller and the system of the present application to send the process control data collected by the automatic control systems of different production sites for different production devices to a process control data storage device, extract process control data available to each production device to be controlled for the production device to be controlled from a process control data storage device on the basis of the production device characteristic parameters and production device loads of process control data, and use the extracted available process control data to train the process control prediction model of the production device to be controlled, the data used for training the process control prediction model is more reliable and the data amount used for training is reduced. Thus, the prediction accuracy and the training efficiency of the process control prediction model of the process controller are improved.

By utilizing the method, the process controller and the system of the present application to further screen the extracted available process control data on the basis of the controlled range of the controlled variable of the process control data, the data amount for training can be reduced while the reliability of the data used for training the process control prediction model is further improved. Thus, the prediction accuracy and the training efficiency of the process control prediction model of the process controller are further improved.

By utilizing the method, the process controller and the system of the present application to further screen the extracted available process control data on the basis of the standard deviation and the variable coupling degree of the process control data, the reliability of the data used for training the process control prediction model can be further improved and the data amount for training can be reduced greatly. Thus, the prediction accuracy and the training efficiency of the process control prediction model of the process controller are further improved.

Now, the subject described in this document is discussed by reference to example embodiments. It should be understood that the discussions about these embodiments are only intended to let those skilled in the art have a better understanding so as to realize the subject described in this document, but are not intended to restrict the scope of protection, applicability, or examples described in the claims. Changes can be made to the functions and arrangements of the discussed elements, without departing from the scope of protection of the disclosure. Various processes or components can be omitted, replaced, or added in different examples, as required. For example, the described method can be executed in a sequence different from what is described, and the steps can be added, omitted or combined. In addition, the characteristics described relative to some examples can also be combined in other examples.

As used in this document, the term "comprise" and its variants are open terms and mean "include but are not limited to." The term "based on" means "at least partially based on." The term "one embodiment" means "at least one embodiment." The term "another embodiment" means "at least one other embodiment." The terms "first" and "second" may refer to different or identical objects. Other definitions, explicit or implicit, may be included below. Unless otherwise specified in the context, the definition of a term is consistent throughout the description.

Figure 2:
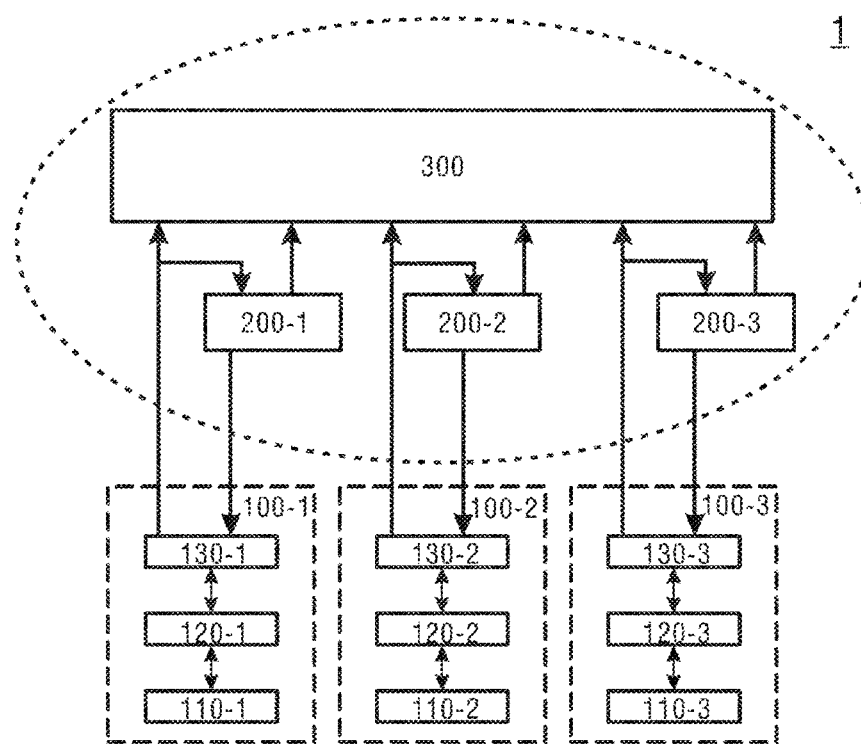
FIG. 2 is a block diagram of the system for process control of the production device of at least one production site according to a first embodiment of the present application.

FIG. 2 is a block diagram of the system 1 (referred to as process control system hereinafter) for process control of the production device of at least one production site according to a first embodiment of the present application.

As shown in FIG. 2, the process control system 1 comprises one or more production sites 100 (for example, 100-1, 100-2, and 100-3), one or more process controllers 200 and a process control data storage device 300. The system 1 shown in FIG. 2 comprises a plurality of process controllers 200-1, 200-2 and 200-3 and each process controller corresponds to one production site 100-1, 100-2 or 100-3.

Each production site 100 may comprise a production device 110 (for example, 110-1, 110-2, or 110-3 shown in FIG. 2). In the present application, the production device 110 refers to a device for production and processing at a site, for example, a numerical control machine or a servo motor.

Each production site 100 may further comprise an automatic control system 120 (for example, 120-1, 120-2, or 120-3 shown in FIG. 2). The automatic control system 120 refers to a software system or hardware system for automatic control of a production device. In the present application, the automatic control system 120 may be a distributed control system (DCS) or a programmable logic controller (PLC). The automatic control system 120 is used to collect process control data of the corresponding production device and send the collected process control data of the production device to the corresponding process controller 200-1, 200-2 or 200-3 and the process control data storage device 300. In one example of the present application, since the automatic control system collects information based on different protocols, preferably, each production site 100 may further comprise a network protocol interface 130, for example, gateway 130 (130-1, 130-2 or 130-3 in FIG. 2), and the network protocol interface 130 is used to realize internetworking between two high-layer protocols. In other words, each gateway 130 is used to realize communication between the corresponding production site 100 and the process controller 200 and communication between the corresponding production site 100 and the process control data storage device 300.

The process control data storage device 300 is used to receive the process control data collected by the automatic control system 120 for each production device from each production site 100 and store the received process control data of each production device as history process control data. The process control data storage device 300 may be a data center, a server or one or more clouds, especially industrial clouds.

In the present application, process control data may comprise operational variable data, controlled variable data and disturbance variable data. An operational variable refers to a variable which can directly be regulated in process control. The regulated value of the operational variable will directly influence a controlled variable. A controlled variable refers to a variable whose value needs to be regulated to a designated value or range. A disturbance variable refers to an uncontrollable variable which will influence a controlled variable. In the present application, the process controller 200 monitors the values of the three variables in real time, uses the history change trends of the three variables to predict the future change trend of the controlled variable and gives a regulated value of the operational variable according to the future change trend, thus keeping the controlled variable steady.

In the present application, process control data may further comprise characteristic information of process control data. The characteristic information is used to represent the characteristics of the process control data, for example, characteristic information of the production device producing the control process data or characteristic information of the process control data. In the present application, characteristic information of the process control data comprises at least production device characteristic parameters and production device loads. Here, production device characteristic parameters refer to characteristic parameters of the production device producing the process control data, and the characteristic parameters are production techniques, capacity, yield and process parameter range. Production device loads refer to load information of the production devices of the process control data.

Alternatively, the characteristic information of process control data may further comprise the controlled range of the controlled variable. For example, if the controlled variable in the process control data is a temperature variable, then the controlled range of the controlled variable refers to the controlled range of the temperature, namely, the range the temperature is controlled in. Alternatively, the characteristic information of process control data may further comprise a standard deviation and/or a variable coupling degree of process control data. Here, the standard deviation is used to indicate the discreteness of data in a statistical group. The variable coupling degree is used to indicate the degree of mutual influence between different variables. In the present application, whether the process control data is normal working condition data can be determined on the basis of the standard deviation and/or the variable coupling degree. For example, a large standard deviation indicates that the data is highly discrete and the production device is in a fluctuating state. Thus, the data is not suitable for correction. If two operational variables and two controlled variables are involved and the coupling degree between them is high, that is to say, a change of each operational variable simultaneously influences the two controlled variables, then it is difficult to tell which operational variable influences the current controlled variables when the two operational variables simultaneously change. Thus, the data cannot be used for correction.

In the present embodiment, each process controller 200 can be used to receive process control data of the production device from the automatic control system of the corresponding production site, utilize the received process control data to predict process control of the production device on the basis of the process control prediction model in the process controller 200, namely, predict the future change trend of the controlled variable in the process control data, and give a regulated value of the operational variable, namely, an operation control instruction for the production device, according to the result of the process control prediction (namely, future change trend of the controlled variable).

In the present embodiment, each process controller 200 is further used to receive history process control data stored in the process control data storage device 300 from the process control data storage device 300 and use the process control data available to the corresponding production device to train the respective process control prediction model. History process control data here comprises process control data produced by the automatic control systems of all production sites 100-1, 100-2 and 100-3.

In the present embodiment, the data storage device 300 may be a server or a cloud, especially an industrial cloud. Preferably, the process control data produced by the automatic control systems of the production sites 100-1, 100-2 and 100-3 are all uploaded to the data storage device 300 through the gateway 130 so that each process controller 200 can invoke history process control data stored in the data storage device 300 and extract all process control data available to the corresponding production device of the process controller 200 to train the process control prediction model. Especially, besides the history data of the corresponding production site, each process controller can further invoke history data produced by adjacent production sites or other production sites connected with the data storage device 300 so that the prediction capability of the process controller is greatly optimized.

Figure 3:
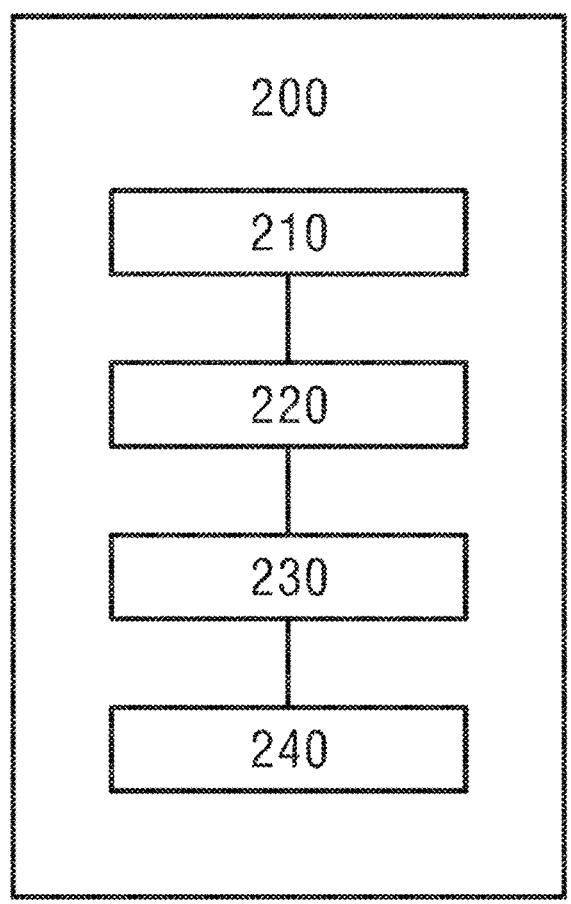
FIG. 3 is an example block diagram of the structure of the process controller in FIG. 2.

FIG. 3 is an example block diagram of the structure of the process controller 200 in FIG. 2. As shown in FIG. 3, the process controller 200 may comprise a deep neural network 210, an enhanced neural network 220, a process control decision-making unit 230 and a process control decision sending unit 240.

The deep neural network 210 extracts process control data available to the corresponding production device from a process control data storage device 300 on the basis of the characteristic information of process control data. According to the present embodiment, the available process control data comprises data produced on the basis of the present production device and data produced on the basis of other production devices and used by the present production device. In the present application, characteristic information of the process control data comprises at least production device characteristic parameters and production device loads. Alternatively, the characteristic information of process control data may further comprise the controlled range of the controlled variable. Alternatively, the characteristic information of process control data may further comprise a standard deviation and a variable coupling degree of process control data. Below, the composition and specific operations of the deep neural network 210 will be described in detail in combination with FIG. 4.

Figure 4:
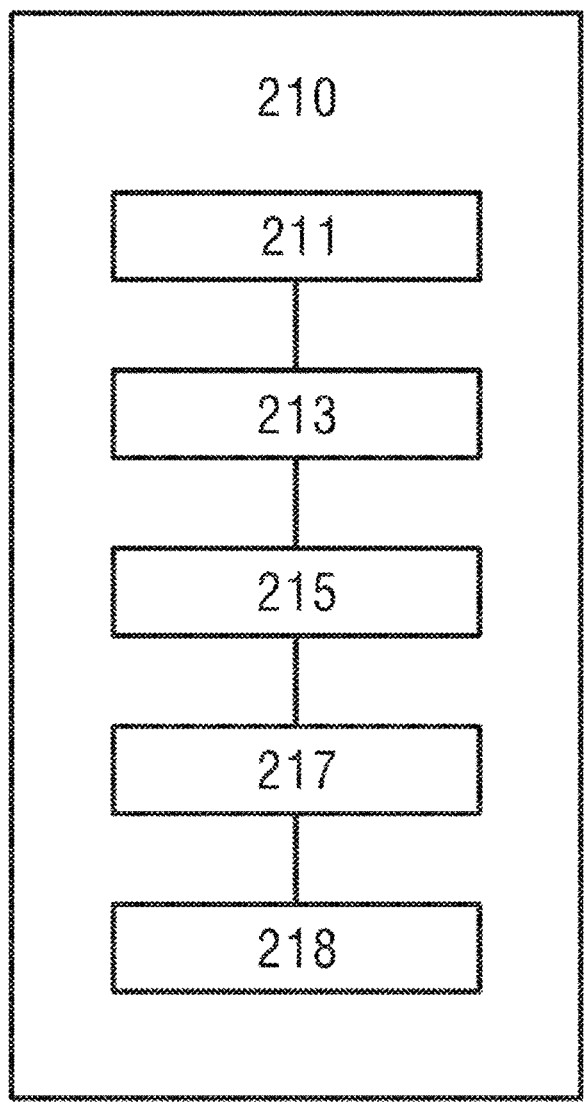
FIG. 4 is an example block diagram of the structure of the deep neural network in FIG. 3.

FIG. 4 is an example block diagram of the structure of the deep neural network 210 in FIG. 3.

As shown in FIG. 4, the deep neural network 210 comprises a characteristic similarity determination module 211 and a load similarity determination module 213.

The characteristic similarity determination module 211 is used to determine a production device having production device characteristic parameters similar to those of the production device to be controlled on the basis of the production device characteristic parameters. For example, the characteristic similarity determination module 211 can determine a production device having production device characteristic parameters similar to those of the production device to be controlled from the production devices producing the obtained history process control data on the basis of the characteristic parameters of different production devices and the production device characteristic parameters of the production device to be controlled.

Then, the load similarity determination module 213 extracts process control data having a production device load similar to the production device load of the production device to be controlled as process control data available to the production device to be controlled from the process control data produced by the production device determined to have similar characteristic parameters.

Alternatively, in another example of the present application, the characteristic information of the process control data may further comprise the controlled range of the controlled variable. Accordingly, the deep neural network 210 may further comprise a controlled range similarity determination module 215 and the controlled range similarity determination module is used to further process the extracted process control data having a production device load similar to the production device load of the production device to be controlled on the basis of the controlled range of the controlled variable to extract process control data in which the controlled range of the controlled variable matches the controlled range of the controlled variable of the production device to be controlled as process control data available to the production device to be controlled.

Alternatively, in another example of the present application, the characteristic information of process control data may further comprise a standard deviation and a variable coupling degree of process control data. Accordingly, the deep neural network 210 may further comprise a normal working condition data determination module 217 and a removal module 218.

The normal working condition data determination module 217 is used to determine whether the process control data is normal working condition data on the basis of the standard deviation and variable coupling degree of the process control data. Then, the removal module 218 removes process control data which is determined to be abnormal working condition data from the process control data.

It should be noted that the operations of the normal working condition data determination module 217 and the removal module 218 are to screen out process control data determined to be abnormal working condition data from the process control data. The process control data operated by the normal working condition data determination module 217 and the removal module 218 may be the process control data acquired from the process control data storage device 300 or may be the process control data output by the load similarity determination module 213 or the controlled range similarity determination module 215. In other words, the operations of the normal working condition data determination module 217 and the removal module 218 may happen before the operation of the characteristic similarity determination module 211, or may happen after the operation of the load similarity determination module 213, or may happen after the operation of the controlled range similarity determination module 215.

Figure 5:
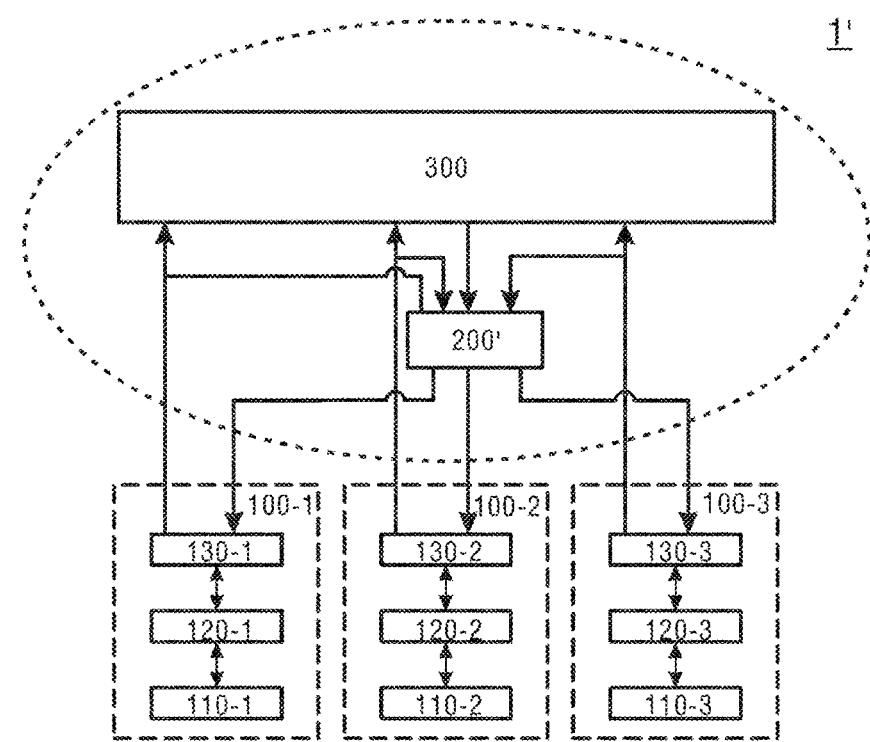
FIG. 5 is a block diagram of the system for process control of the production device of at least one production site according to a second embodiment of the present application.

FIG. 5 is a block diagram of the system 1' for process control of the production device of at least one production site according to a second embodiment of the present application. Compared with FIG. 2, only the process controller 200' in the system 1' is different and the functions and structures of other components in the process control system 1' are completely the same as those of the corresponding components in FIG. 2. The same functions and structures are not described again here. In the present embodiment, a centralized process controller 200' is provided for a plurality of production sites, and the centralized process controller 200' can be used to receive process control data of the production device from the automatic control system of each production site, utilize the received process control data to predict process control of the production device on the basis of the process control prediction model in the process controller 200', namely, predict the future change trend of the controlled variable in the process control data, and give a regulated value of the operational variable, namely, an operation control instruction for the production device, according to the result of the process control prediction (namely, future change trend of the controlled variable).

In the present embodiment, the centralized process controller 200' is further used to receive history process control data stored in the process control data storage device 300 from the process control data storage device 300, extract all process control data available to the production device to be controlled, and use the extracted process control data to train the process control prediction model. History process control data here comprises process control data produced by the automatic control systems of all production sites 100-1, 100-2 and 100-3. The history process control data in the process control data storage device 300 may further comprise data collected from other production sites or commercial history data purchased.

Figure 6:
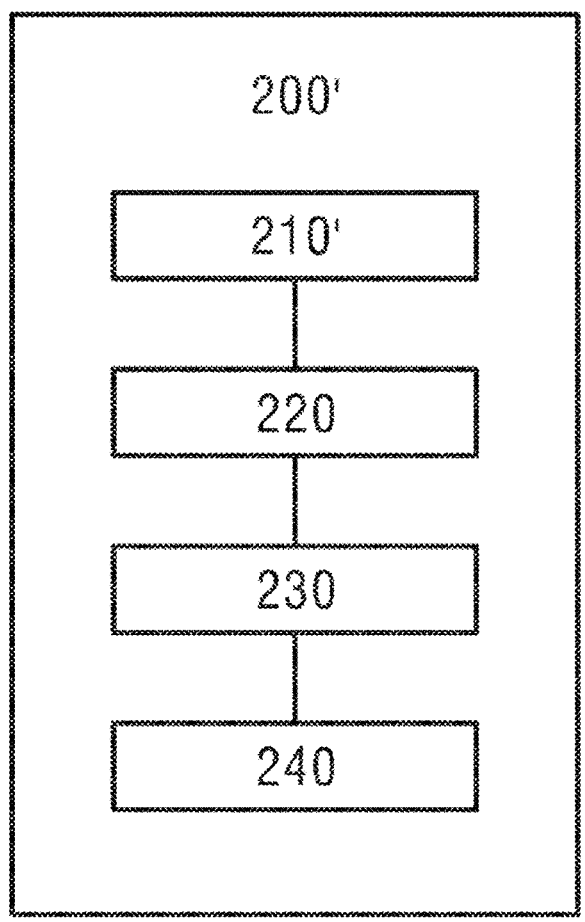
FIG. 6 is an example block diagram of the structure of the process controller in FIG. 5.

In the present embodiment, the data storage device 300 may be a server or a cloud, especially an industrial cloud. Preferably, the process control data produced by the automatic control systems of the production sites 100-1, 100-2 and 100-3 are all uploaded to the data storage device 300 through the gateway 130 so that the process controller 200' can invoke history process control data stored in the data storage device 300 and extract therefrom all process control data available to the production device to be controlled to train the process control prediction model. Especially, besides the history data of the corresponding production site of the production device to be controlled, the process controller can further invoke history data produced by adjacent production sites or other production sites connected with the data storage device 300 so that the prediction capability of the process controller is greatly optimized. FIG. 6 is an example block diagram of the structure of the process controller 200' in FIG. 5. As shown in FIG. 6, the process controller 200' comprises a deep neural network 210', an enhanced neural network 220, a process control decision-making unit 230 and a process control decision sending unit 240. Compared with FIG. 3, only the deep neural network 210' is different and the functions and structures of other components in the process controller 200' are completely the same as those of the corresponding components in FIG. 3. The same functions and structures are not described again here.

Figure 7:
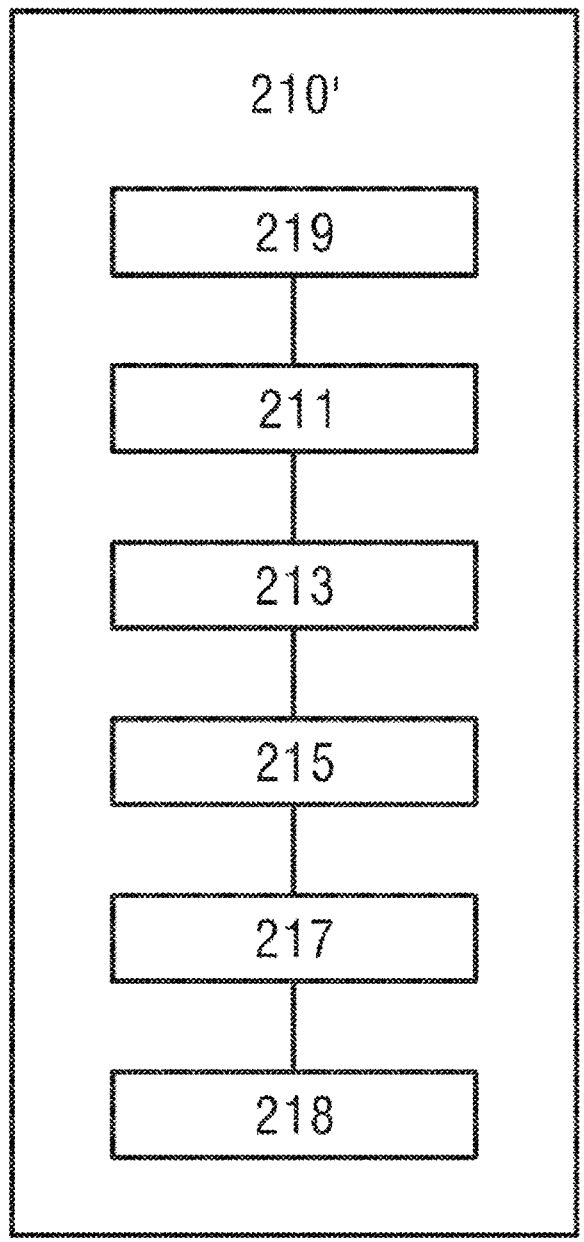
FIG. 7 is an example block diagram of the structure of the deep neural network in FIG. 6.

FIG. 7 is an example block diagram of the structure of the deep neural network 210' in FIG. 6. The difference of the deep neural network 210' shown in FIG. 7 from what is shown in FIG. 4 is that the deep neural network 210' further comprises an acquisition module 219. The other components of the deep neural network 210' are completely the same as the corresponding components of the deep neural network 210 shown FIG. 4 and are not described again here.

As shown in FIG. 7, the acquisition module 219 of the deep neural network 210' is used to acquire characteristic information of process control data of the production device to be controlled. For example, in one example, the acquisition module 219 may receive characteristic information of process control data of the production device to be controlled from the automatic control system of the corresponding production site. In another example, a correspondence table between unique identifications of production devices and characteristic information of process control data may be stored in the deep neural network 210'. The acquisition module 219 can receive the unique identification of the production device to be controlled from the automatic control system of the corresponding production site. Then, the acquisition module 219 acquires the characteristic information of the corresponding process control data from the correspondence table between unique identifications of production devices and characteristic information of process control data on the basis of the received unique identification of the production device to be controlled.

Then, the characteristic similarity determination module 211 determines a production device having production device characteristic parameters similar to those of the production device to be controlled on the basis of the acquired characteristic information of process control data. Then, the load similarity determination module 213, the controlled range similarity determination module 215, the normal working condition data determination module 217 and the removal module 218 perform their respective corresponding operations to extract process control data available to the production device to be controlled.

After the deep neural network 210, 210' extracts process control data available to the production device to be controlled, the enhanced neural network 220 uses the extracted available process control data to train the process control prediction model, and then uses the real-time process control data from the production device to be controlled to predict process control on the basis of the trained process control prediction model.

The process control decision-making unit 230 determines an operation control instruction for the production device to be controlled on the basis of the result of the process control prediction.

Alternatively, the process controller 200 may further comprise a process control decision sending unit 240. The process control decision sending unit 240 receives the determined operation control instruction for the production device to be controlled from the process control decision-making unit 230, and sends the determined operation control instruction for the production device to be controlled to the automatic control system of the production device to be controlled so that the automatic control system controls the operation of the production device according to the operation control instruction.

In one example of the present application, the process controller 200 and the process control data storage device 300 may be deployed in a cloud server, that is to say, may be implemented on a cloud. In addition, the process control storage device 300 may be implemented as a process control database in a cloud server. The process controller 200 may also be implemented as an application module, namely, APP module, in a cloud server.

The device and system for process control of the production device of at least one production site according to the present application are described above by reference to FIGS. 2 to 7. The method for process control of the production device of at least one production site according to the present application is described below in combination with FIGS. 8 to 10.

Figure 8:
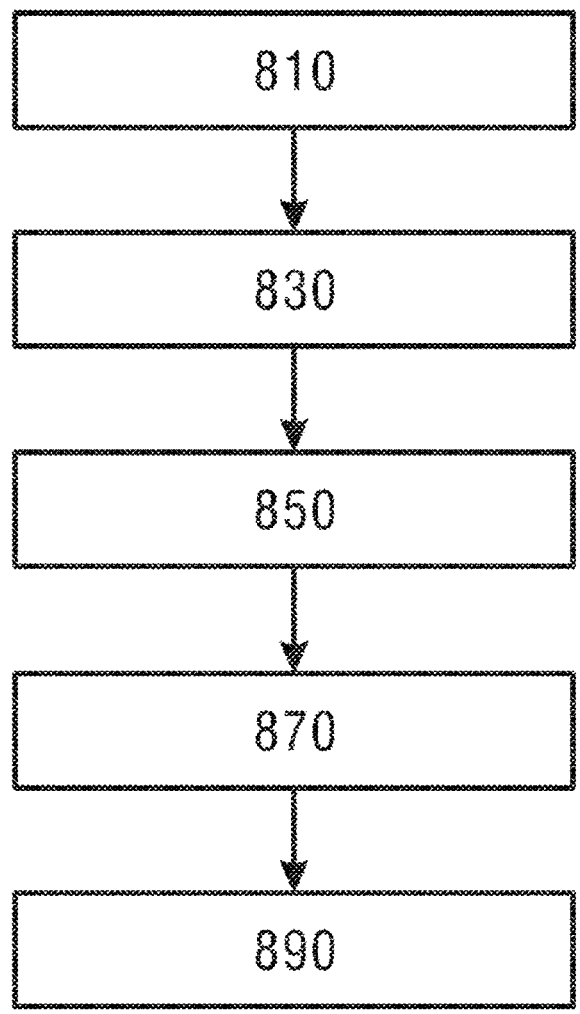
FIG. 8 is a flowchart of the method for process control of the production device of at least one production site according to a third embodiment of the present application.

FIG. 8 is a flowchart of the method for process control of the production device of at least one production site according to an embodiment of the present application. In the present application, the method is usually executed by control programs or control modules.

As shown in FIG. 8, in block 810, process control data available to the production device 110 to be controlled is extracted from the process control data storage device 300 on the basis of the characteristic information of process control data, wherein history process control data of at least one production device 110 is stored in the process control data storage device 300 and the characteristic information of the process control data comprises at least production device characteristic parameters and production device loads. The operation in block 810 is the same as the operation of the deep neural network 210 (in the case that the system 1 comprises a plurality of process controllers, the production device to be controlled is the corresponding production device of a process controller) described by reference to FIGS. 3 and 4 or the deep neural network 210' (in the case that the system comprises a single process controller) described by reference to FIGS. 6 and 7.

Then, in block 830, the extracted available process control data is used to train a process control prediction model. In block 850, real-time process control data from the production device to be controlled is utilized to predict the process control on the basis of the trained process control prediction model. The operations in block 830 and block 850 are the same as the operations of the enhanced neural network 220 described by reference to FIG. 3 or 6.

Then, in block 870, an operation control instruction is determined for the production device to be controlled on the basis of the result of the process control prediction. The operation in block 870 is the same as the operation of the process control decision-making unit 230 described by reference to FIG. 3 or 6.

Alternatively, the method may further comprises: sending the determined operation control instruction for the production device to be controlled to the automatic control system of the production device to be controlled so that the automatic control system controls the operation of the production device according to the operation control instruction in block 890. The operation in block 890 is the same as the operation of the process control decision sending unit 240 described by reference to FIG. 3 or 6.

Alternatively, in another example of the present application, the method for process control of the production device of at least one production site may not comprise the operation in block 830, that is to say, the operation in block 830 can be completed by a separate training program or training module. Specifically, after performing the operation of extracting available process control data in block 810, the control module or control program sends the extracted available process control data to the training program or training module. Then, the training program or training module uses the received available process control data to train the process control prediction model, and then the control program or control module invokes the trained process control prediction model to predict process control.

As described above, in one embodiment of the present application, the process controller 200 may comprise a plurality of process controllers and each process controller corresponds to one production site. In another example of the present application, the process controller 200 may also comprise only one process controller and the process controller is used to determine the operation control instructions for the production devices of all production sites.

Figure 9:
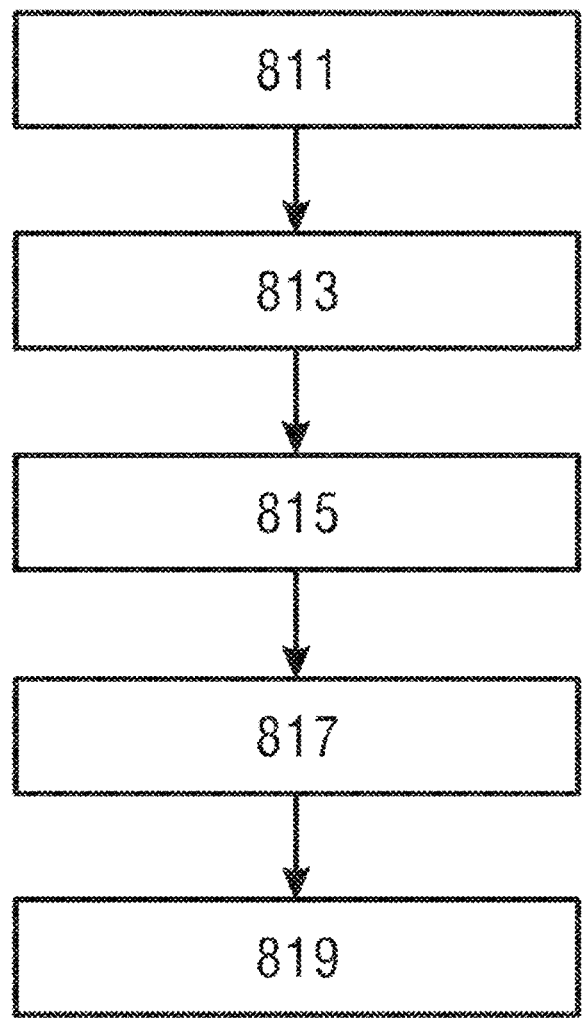
FIG. 9 is a flowchart of one example of the extraction of process control data available to a production device to be controlled from a process control database according to a third embodiment of the present application.

FIG. 9 is a flowchart of one example of the extraction of process control data available to the production device to be controlled from the process control database according to one embodiment of the present application. The example of the extraction of process control data available to the production device to be controlled from the process control database in Fig. corresponds to the situation where the process controller comprises a plurality of process controllers and each process controller corresponds to the production device of one production site. In the present example, the production device to be controlled refers to the corresponding production device of the process controller.

As shown in FIG. 9, in block 811, a production device having production device characteristic parameters similar to those of the production device to be controlled is determined on the basis of the production device characteristic parameters. The operation in block 811 is the same as the operation of the characteristic similarity determination module 211 described by reference to FIG. 4.

Then, in block 813, process control data having a production device load similar to the production device load of the production device to be controlled is extracted as process control data available to the production device to be controlled from the process control data produced by the production device determined to have similar characteristic parameters. The operation in block 813 is the same as the operation of the load similarity determination module 213 described by reference to FIG. 4.

Alternatively, in another example of the present application, the characteristic information of the process control data may further comprise the controlled range of the controlled variable. Accordingly, the process of extracting process control data available to the production device to be controlled from the process database may further comprise: further processing the extracted process control data having a production device load similar to the production device load of the production device to be controlled on the basis of the controlled range of the controlled variable to extract process control data in which the controlled range of the controlled variable matches the controlled range of the controlled variable of the production device to be controlled as process control data available to the production device to be controlled in block 815. The operation in block 815 is the same as the operation of the controlled range similarity determination module 215 described by reference to FIG. 4.

Alternatively, in another example of the present application, the characteristic information of process control data may further comprise a standard deviation and a variable coupling degree of process control data. Accordingly, the process of extracting process control data available to the production device to be controlled from the process database may further comprise: determining whether the process control data is normal working condition data on the basis of the standard deviation and variable coupling degree of process control data in block 817. The operation in block 817 is the same as the operation of the normal working condition data determination module 217 described by reference to FIG. 4. Then, in block 819, process control data which is determined to be abnormal working condition data is removed from the process control data. The operation in block 819 is the same as the operation of the removal module 218 described by reference to FIG. 4.

It should be noted that the operations in blocks 817 and 819 are to screen out process control data which is determined to be abnormal working condition data from the process control data. The process control data to which the operations in block 817 and block 819 are directed may be process control data acquired from the process control data storage device 300 or may be process control data output after the processing in block 813 or block 815. In other words, the operations in block 817 and block 819 may happen before the operation in block 811 or happen after the operation in block 813 or happen after the operation in block 815.

Figure 10:
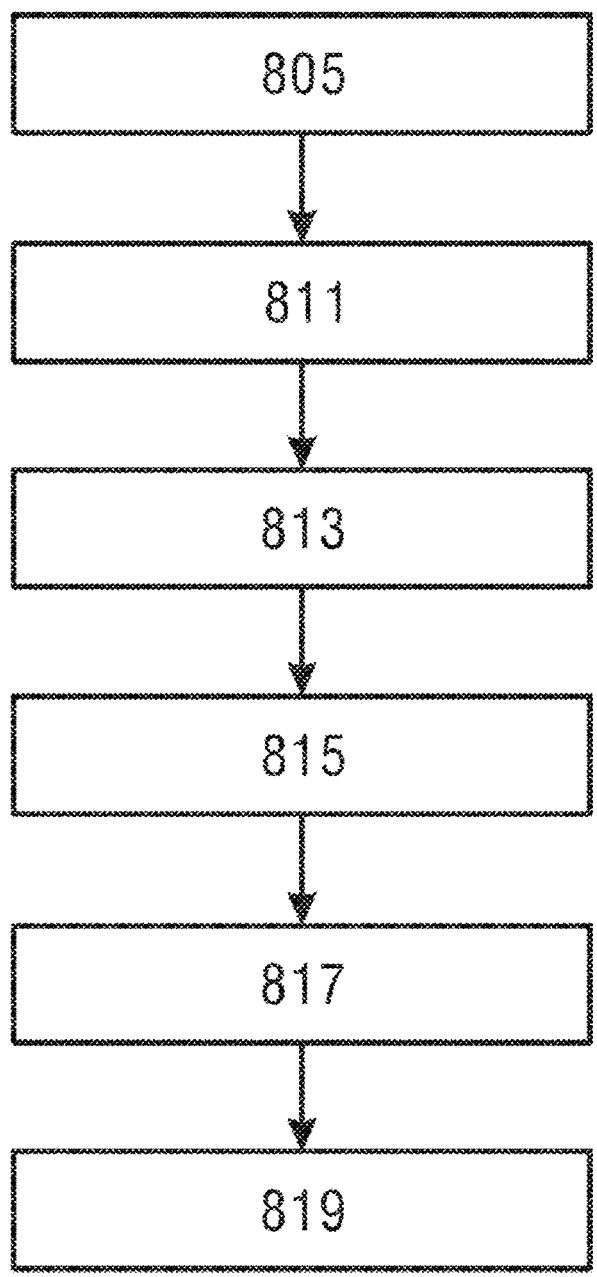
FIG. 10 is a flowchart of another example of the extraction of process control data available to a production device to be controlled from a process control database according to a third embodiment of the present application.

FIG. 10 is a flowchart of one example of the extraction of process control data available to the production device to be controlled from a process control database according to one embodiment of the present application. The example of the process of extracting process control data available to the production device to be controlled from the process database in FIG. 10 corresponds to the situation where only one process controller is involved. Different from FIG. 9, the process of extracting process control data available to the production device to be controlled from the process database in FIG. 10 further comprises the acquisition operation in block 805. Except the above-mentioned difference, the operations in the blocks in the process shown in FIG. 10 are completely the same as the operations in the corresponding blocks shown in FIG. 9 and these operations are not described again here.

As shown in FIG. 10, in block 805, characteristic information of the process control data of the production device to be controlled is acquired. The operation in block 805 is the same as the operation of the acquisition module 219 described by reference to FIG. 7.

The embodiments of the method, device and system for process control of the production device of at least one production site according to the present application are described above by reference to FIGS. 1 to 10. The process controller may be implemented by use of hardware, software or a combination of hardware and software.

Figure 11:
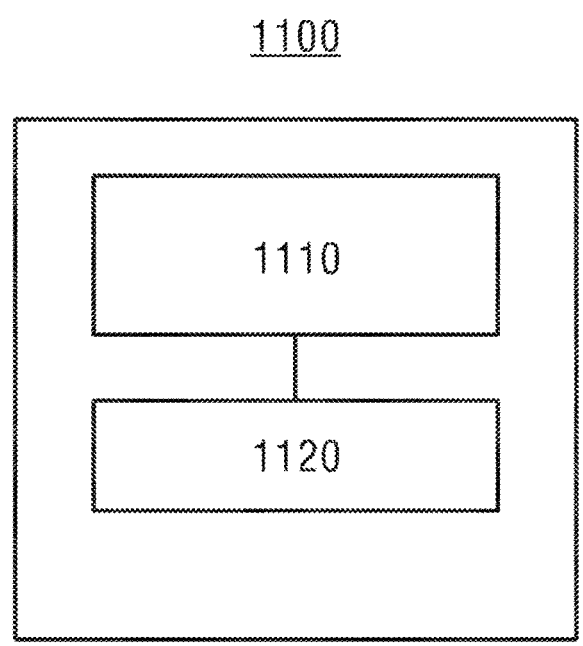
FIG. 11 is a block diagram of the computing device for process control of the production device of at least one production site according to the present application.

In the present application, the process controller 200 may be implemented by use of a computing device. FIG. 11 is a block diagram of the computing device 1100 for process control of the production device of at least one production site according to the present application. According to one embodiment, the computing device 1100 may comprise a processor 1110, and the processor 1110 executes at least one computer-readable instruction (namely, the above-mentioned element implemented by software) stored or coded in the computer-readable storage medium (namely, memory 1120).

In one embodiment, computer executable instructions are stored in the memory 1120, and when the computer executable instructions are executed, at least one processor 1110: extracts process control data available to the production device to be controlled from the process control data storage device on the basis of characteristic information of process control data, wherein history process control data of at least one production device is stored in the process control data storage device and the characteristic information of the process control data comprises at least production device characteristic parameters and production device loads, utilizes real-time process control data from the production device to be controlled to predict the process control on the basis of a process control prediction model, wherein the process control prediction model is trained by using the extracted available process control data, and determines an operation control instruction for the production device to be controlled on the basis of the result of the process control prediction.

It should be understood that when the computer executable instructions stored in the memory 1120 are executed, at least one processor 1110 will execute various operations and functions described in combination with FIGS. 2 to 10 in the embodiments of the present application.

According to one embodiment, a program product, for example, non-transitory machine-readable medium, is provided. The non-transitory machine-readable medium may have instructions (namely, the above-mentioned elements implemented by software). When the instructions are executed by a machine, the machine will execute various operations and functions described in combination with FIGS. 2 to 10 in the embodiments of the present application.

The embodiments described above in combination with the drawings are only example embodiments, but do not represent all embodiments that can be realized or fall within the scope of protection of the claims. The term "example" used in the whole description means "used as an example, instance or illustration", but does not mean "preferable" to or "advantageous" over other embodiments. For the purpose of providing an understanding of the described techniques, the embodiments cover specific details. However, these techniques may be carried out without these specific details. In some embodiments, well-known structures and devices are shown in the form of a block diagram to avoid difficulty in understanding the concepts in the described embodiments.

The above-mentioned description of the present disclosure is provided so that those skilled in the art can realize or use the present disclosure. Various modifications to the present disclosure are apparent to those skilled in the art, and in addition, the general principle defined in this document can be applied to other variants, without departing from the scope of protection of the present disclosure. Therefore, the present disclosure is not limited to the examples and designs in this document, but is consistent with the widest scope of the principle and novelty characteristics disclosed in this document.

The invention claimed is:

1. A process control system, comprising:
at least one process controller including
  a first neural network configured to
    determine, from history process control data stored on a process control storage device, a first production device based upon at least one of a load of a controlled production device and loads included in the history process control data, or a controlled range of a controlled variable of the controlled production device and controlled ranges of controlled variables in the history process control data, and
    extract, from device process control data produced by the first production device, device process control data based at least in part upon at least one of production device characteristic parameters or production device loads included in characteristic information of the device process control data, the characteristic information of the device process control data including at least the production device characteristic parameters and the production device loads, and
  a second neural network configured to predict a process control based on real-time process control data from the controlled production device using a process control prediction model based on the extracted device process control data,
  wherein the at least one process controller is configured to determine an operation control instruction for the controlled production device based upon the predicted process control; and
an automatic control system of the controlled production device configured to
  receive the determined operation control instruction, and
  control operation of the controlled production device according to the operation control instruction.

2. The process control system of claim 1, wherein the first neural network is further configured to:
acquire characteristic information of the process control data of the controlled production device.

3. The process control system of claim 1, wherein the device process control data includes at least one of operational variable data, controlled variable data, or disturbance variable data.

4. The process control system of claim 3, wherein the characteristic information includes a controlled range of a controlled variable, and
wherein the first neural network is further configured to
  extract, from the extracted device process control data, process control data in which a controlled range of a controlled variable matches the controlled range of the controlled variable of the controlled production device.

5. The process control system of claim 3, wherein the characteristic information includes a standard deviation and a variable coupling degree of process control data, and
wherein the first neural network is further configured to
  determine whether the device process control data is normal working condition data based upon the standard deviation and variable coupling degree of the process control data, and remove determined abnormal device process control data.

6. The process control system of claim 1, further comprising:
at least one production site, wherein each of the at least one production site comprises production devices and the automatic control system; and,
a process control data storage device, configured to store history process control data of at least one production device.

7. The process control system of claim 6, wherein each of the at least one production site comprises a network protocol interface configured to support communication between
a respective production site of the at least one production site and the at least one process controller, and
the respective production site and the process control data storage device.

8. The process control system of claim 6, wherein the at least one process controller and the process control data storage device are deployed in a cloud server.

9. The process control system of claim 6, wherein the process controller is implemented as an application module.

10. A method for process control of a production device of at least one production site, the method comprising:
determining, from history process control data stored on a process control data storage device, a first production device based upon at least one of a load of a controlled production device and loads included in the history process control data, or a controlled range of a controlled variable of the controlled production device and controlled ranges of controlled variables in the history process control data;
extracting, from device process control data produced by the first production device, device process control data based at least in part upon at least one of production device characteristic parameters or production device loads included in characteristic information of the device process control data, wherein the characteristic information of the device process control data includes at least the production device characteristic parameters and the production device loads;
predicting a process control based on real-time process control data from the controlled production device using a process control prediction model based on the extracted device process control data;
determining an operation control instruction for the controlled production device based upon the predicted process control; and
controlling operation of the controlled production device according to the operation control instruction.

11. The method of claim 10, further comprising:
acquiring characteristic information of the process control data of the controlled production device.

12. The method of claim 10, wherein the device process control data includes at least one of operational variable data, controlled variable data, or disturbance variable data.

13. The method of claim 12, wherein the characteristic information of the process control data comprises at least one of:
a controlled range of a controlled variable,
a standard deviation, or
a variable coupling degree.

14. A non-transitory machine-readable storage medium, storing executable instructions, wherein when the instructions are executed at a machine, the machine is configured to execute the method of claim 10.

15. A non-transitory machine-readable storage medium, storing executable instructions, wherein when the instructions are executed at a machine, the machine is configured to execute the method of claim 11.

16. A computing device, comprising:
at least one processor, and
a memory coupled with the at least one processor, configured to store instructions, wherein when the instructions are executed by the at least one processor, the processor is configured to execute at least:
determining, from history process control data stored on a process control data storage device, a first production device based upon at least one of a load of a controlled production device and loads included in the history process control data, or a controlled range of a controlled variable of the controlled production device and controlled ranges of controlled variables in the history process control data;
extracting, from device process control data produced by the first production device, device process control data based at least in part upon at least one of production device characteristic parameters or production device loads included in characteristic information of the device process control data, wherein the characteristic information of the device process control data includes at least the production device characteristic parameters and the production device loads;
predicting a process control based on real-time process control data from the controlled production device using a process control prediction model based on the extracted device process control data;
determining an operation control instruction for the controlled production device based on the predicted process control; and
controlling operation of the controlled production device according to the operation control instruction.

* * * * *